(12) United States Patent
Chang et al.

(10) Patent No.: US 12,729,961 B2
(45) Date of Patent: Sep. 8, 2026

(54) ELECTRONIC DEVICE FOR IDENTIFYING MOVING DIRECTION OF ELECTRONIC DEVICE, AND OPERATING METHOD FOR ELECTRONIC DEVICE

(71) Applicant: Samsung Electronics Co., Ltd., Suwon-si (KR)

(72) Inventors: Dukhyun Chang, Suwon-si (KR); Hyoungjoo Lee, Suwon-si (KR); Taeyoon Kim, Suwon-si (KR); Chaeman Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 330 days.

(21) Appl. No.: 18/463,599

(22) Filed: Sep. 8, 2023

(65) Prior Publication Data

US 2023/0417547 A1 Dec. 28, 2023

Related U.S. Application Data

(63) Continuation of application No. PCT/KR2022/002599, filed on Feb. 22, 2022.

(30) Foreign Application Priority Data

Mar. 10, 2021 (KR) ........................ 10-2021-0031522

(51) Int. Cl.
*G01C 17/28* (2006.01)
*G01P 15/00* (2006.01)

(52) U.S. Cl.
CPC .............. *G01C 17/28* (2013.01); *G01P 15/00* (2013.01)

(58) Field of Classification Search
CPC ................................ G01C 17/28; G01P 15/00
(Continued)

(56) References Cited

U.S. PATENT DOCUMENTS 4,729,172 A 3/1988 Alberter et al.
5,615,116 A * 3/1997 Gudat .................... B60K 31/04 318/587
(Continued)

FOREIGN PATENT DOCUMENTS

CN 105806333 A 7/2016
CN 108413957 A 8/2018
(Continued)

OTHER PUBLICATIONS

International Search Report for PCT/KR2022/002599 mailed May 31, 2022, 5 pages.
(Continued)

*Primary Examiner* — Giovanni Astacio-Oquendo
*Assistant Examiner* — Trung Q Nguyen
(74) *Attorney, Agent, or Firm* — Nixon & Vanderhye P.C.

(57) ABSTRACT

An electronic device according to various embodiments comprises: a geomagnetic sensor; a posture sensor configured to measure a posture of the electronic device; and a processor operatively connected to the geomagnetic sensor and the posture sensor, wherein the processor may be configured to: obtain a plurality of magnetic field vectors from the geomagnetic sensor; obtain posture information about the electronic device from the posture sensor; correct, on the basis of the posture information about the electronic device, the plurality of magnetic field vectors so that the posture of the electronic device reaches a designated posture; identify a plurality of interference vectors on the basis of the plurality of corrected magnetic field vectors and a magnetic north vector; rotate a straight line connecting a plurality of magnetic field measurement points measured by the geomagnetic sensor to identify a rotation angle in which extending lines of the plurality of interference vectors converge at one point; and identify a traveling direction of the
(Continued)

electronic device on the basis of the identified rotation angle. A corresponding method may also be provided.

18 Claims, 12 Drawing Sheets

(58) Field of Classification Search
USPC ...................... 324/500, 600, 76.11, 200, 202
See application file for complete search history.

(56) References Cited

U.S. PATENT DOCUMENTS 6,630,993 B1 * 10/2003 Hedges .................. G06Q 10/08 356/141.5
9,021,709 B2 * 5/2015 Oliver .................... G01C 17/38 33/356
11,348,269 B1 * 5/2022 Ebrahimi Afrouzi ... G01S 17/48
2005/0194973 A1 9/2005 Kwon et al.
2010/0060286 A1 * 3/2010 Summerfield ......... G01V 3/083 324/334
2010/0085054 A1 * 4/2010 Nielsen .................... G01V 3/38 324/326
2012/0290254 A1 11/2012 Thrun et al.
2013/0057260 A1 3/2013 Kim et al.
2014/0130361 A1 5/2014 Oliver et al.
2014/0172356 A1 6/2014 Kim et al.
2020/0143710 A1 * 5/2020 Zhou .................... G05D 1/0246
2020/0232796 A1 * 7/2020 Lee ........................ G01C 21/18
2021/0123746 A1 4/2021 Chang et al.
2022/0284596 A1 9/2022 Chang et al.
2023/0271057 A1 * 8/2023 Bentley .............. A63B 69/3632 73/493

FOREIGN PATENT DOCUMENTS

CN 109931960 A 6/2019
CN 107014388 B 8/2020
JP 3915654 B2 2/2007
KR 100506097 B1 8/2005
KR 101810985 B1 12/2017
KR 101957748 B1 3/2019
WO 2021080163 A1 4/2021
WO 2021107349 A1 6/2021

OTHER PUBLICATIONS

Written Opinion of the ISA for PCT/KR2022/002599 mailed May 31, 2022, 4 pages.
Korean Office Action dated Jan. 8, 2026 for KR Application No. 10-2021-0031522.

* cited by examiner

FIG. 1

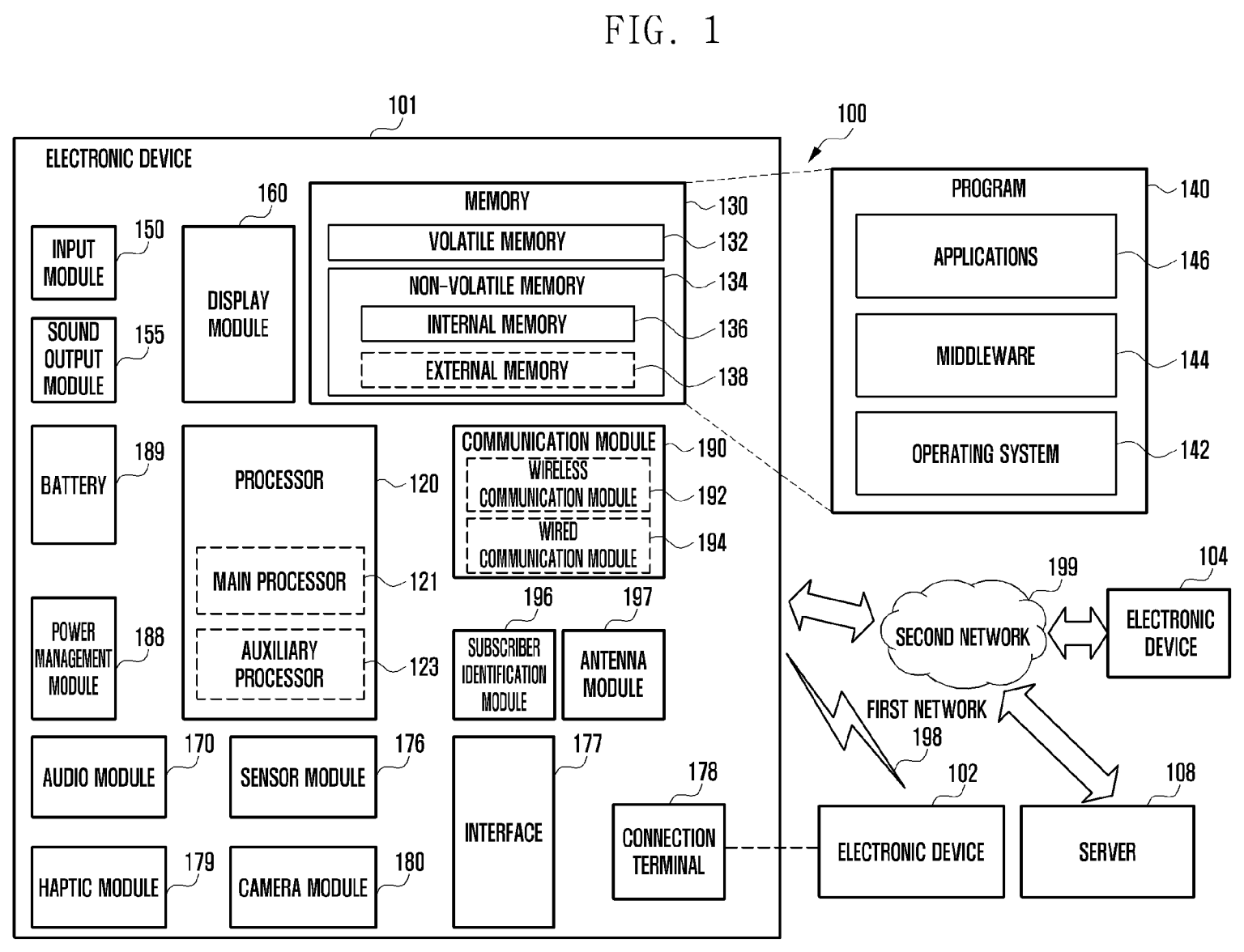

100
101 ELECTRONIC DEVICE
150 INPUT MODULE
155 SOUND OUTPUT MODULE
160 DISPLAY MODULE
130 MEMORY
132 VOLATILE MEMORY
134 NON-VOLATILE MEMORY
136 INTERNAL MEMORY
138 EXTERNAL MEMORY
189 BATTERY
188 POWER MANAGEMENT MODULE
120 PROCESSOR
121 MAIN PROCESSOR
123 AUXILIARY PROCESSOR
190 COMMUNICATION MODULE
192 WIRELESS COMMUNICATION MODULE
194 WIRED COMMUNICATION MODULE
196 SUBSCRIBER IDENTIFICATION MODULE
197 ANTENNA MODULE
170 AUDIO MODULE
176 SENSOR MODULE
177 INTERFACE
178 CONNECTION TERMINAL
179 HAPTIC MODULE
180 CAMERA MODULE
140 PROGRAM
146 APPLICATIONS
144 MIDDLEWARE
142 OPERATING SYSTEM
199 SECOND NETWORK
198 FIRST NETWORK
104 ELECTRONIC DEVICE
108 SERVER
102 ELECTRONIC DEVICE

ELECTRONIC DEVICE FOR IDENTIFYING MOVING DIRECTION OF ELECTRONIC DEVICE, AND OPERATING METHOD FOR ELECTRONIC DEVICE

CROSS-REFERENCE TO RELATED APPLICATIONS

This application is a continuation of International Application No. PCT/KR2022/002599 designating the United States, filed on Feb. 22, 2022, in the Korean Intellectual Property Receiving Office, and claiming priority to Korean Patent Application No. 10-2021-0031522, filed on Mar. 10, 2021, in the Korean Intellectual Property Office, the disclosures of each of which are incorporated by reference herein in their entireties.

BACKGROUND

Field

The disclosure relates to an electronic device and a method of operating the electronic device for identifying a moving direction of the electronic device.

Description of Related Art

Technology for tracking a location of an electronic device such as positioning or localization may increase usability in various scenarios applicable to electronic devices.

More specifically, technology that indicates a movement direction of an electronic device in an indoor location service such as a geofencing service that determines whether a specific point-of-interest is entered or exited may improve a quality of the service and be applied to various scenarios.

Global positioning system (GPS) technology using artificial satellites is used as technology for tracking a location and/or moving direction of an electronic device outdoors. However, GPS signals are characterized by strong linearity and poor diffraction and reflection, making it difficult to use GPS signals indoors.

Therefore, technology for tracking a location and/or moving direction of an electronic device indoors specifies and tracks the location in an indoor space using a six-axis sensor (acceleration sensor and gyroscope sensor) of the electronic device or using a WiFi signal, a Bluetooth beacon signal, or an indoor magnetic field.

Technology for tracking a moving direction of an electronic device using a six-axis sensor is difficult to derive an accurate direction due to a difference between a gait pattern of a person holding the electronic device and a signal according to a holding type (arm swing, pocket, bag, and the like) of the electronic device.

Further, technology for specifying a location of an electronic device using a WiFi signal or a Bluetooth beacon signal requires WiFi and Bluetooth infrastructure, and the technology for specifying the location of the electronic device using an indoor magnetic field requires information such as a map of an indoor space and a fingerprint map in a magnetic field.

Conventionally, technology used for tracking a moving direction of an electronic device indoors requires additional infrastructure such as Wi-Fi or Bluetooth or additional information such as an indoor map or a fingerprint map of a magnetic field.

SUMMARY

Embodiments of the disclosure provide an electronic device and method of operating the electronic device capable of tracking a moving direction of the electronic device using a distorted feature of the Earth's magnetic field without additional infrastructure or additional information.

Embodiments of the disclosure provide an electronic device and method of operating the electronic device capable of finding an interference point that contributes to magnetic field distortion and tracking a moving direction of the electronic device based on an interference point using a magnetic field vector measured by a magnetic field sensor.

Embodiments of the disclosure provide an electronic device that uses a magnetic field vector, because an electronic device of various embodiments uses a magnetic field vector, the electronic device may track a movement direction as long as the electronic device moves independently of a user's gait pattern holding the same and a method of holding the same.

Embodiments of the disclosure provide and electronic device and method of operating the electronic device for tracking a moving direction thereof to be applied to various scenarios of an indoor location service and improve a quality of a service.

According to various example embodiments, an electronic device may include: a geomagnetic sensor, a posture sensor configured to measure a posture of the electronic device; and a processor operably connected with the geomagnetic sensor and the posture sensor, wherein the processor may be configured to: acquire a plurality of magnetic field vectors from the geomagnetic sensor, acquire posture information of the electronic device from the posture sensor, correct the plurality of magnetic field vectors to cause a posture of the electronic device to be a designated posture based on posture information of the electronic device, identify a plurality of interference vectors based on the plurality of corrected magnetic field vectors and a magnetic north vector, identify a rotation angle at which lines extending the plurality of interference vectors converge at one point by rotating a straight line connecting a plurality of magnetic field measurement points measured by the geomagnetic sensor, and identify a moving direction of the electronic device based on the identified rotation angle.

According to various example embodiments, a method of operating an electronic device may include: acquiring a plurality of magnetic field vectors from a geomagnetic sensor, acquiring posture information of the electronic device from a posture sensor, correcting the plurality of magnetic field vectors to cause a posture of the electronic device to be a designated posture based on posture information of the electronic device; identifying a plurality of interference vectors based on the plurality of corrected magnetic field vectors and a magnetic north vector; identifying a rotation angle at which lines extending the plurality of interference vectors converge at one point by rotating a straight line connecting a plurality of magnetic field measurement points measured by the geomagnetic sensor, and identifying a moving direction of the electronic device based on the identified rotation angle.

Moving direction tracking technology of an electronic device using a magnetic field can track a moving direction of an electronic device even indoors.

Further, various example embodiments of the disclosure can track a moving direction of an electronic device indoors without additional infrastructure such as WiFi and Bluetooth beacons.

Further, various example embodiments of the disclosure can track a moving direction of an electronic device indoors without additional information such as an indoor map or a fingerprint map.

Further, various example embodiments of the disclosure can track a moving direction of an electronic device regardless of a user's gait type holding the electronic device and a type of holding the electronic device.

Further, various example embodiments of the disclosure, may improve a quality of a service, and various scenarios using movement direction tracking technology of the electronic device can be implemented.

Further, various example embodiments of the disclosure can provide movement information of an electronic device with high accuracy.

BRIEF DESCRIPTION OF THE DRAWINGS

In connection with the description of the drawings, the same or similar reference numerals may be used for the same or similar components.

The above and other aspects, features and advantages of certain embodiments of the present disclosure will be more apparent from the following detailed description, taken in conjunction with the accompanying drawings, in which:

FIG. 1 is a block diagram illustrating an example electronic device in a network environment according to various embodiments;

DETAILED DESCRIPTION

Figure 2:
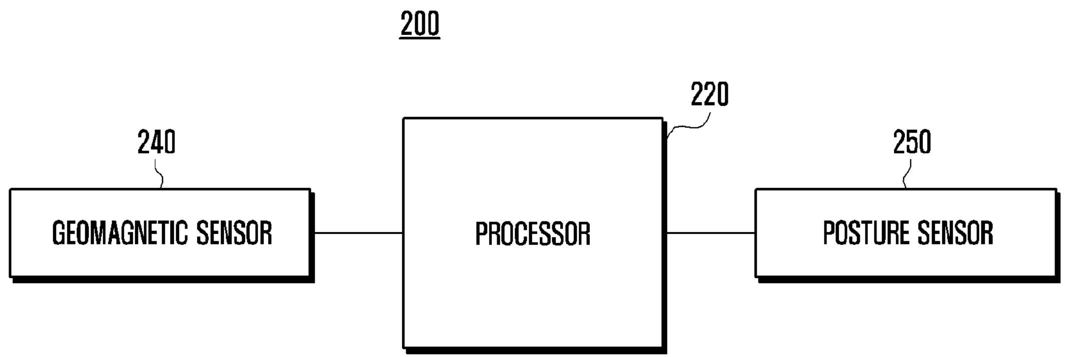
FIG. 2 is a block diagram illustrating an example configuration of an electronic device according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory may include at least one of an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of ims or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g. electronic devices 102 and 104 or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 is a block diagram illustrating an example configuration of an electronic device according to various embodiments.

With reference to FIG. 2, an electronic device 200 (e.g., the electronic device 101 of FIG. 1) may include a processor (e.g., including processing circuitry) 220 (e.g., the processor 120 of FIG. 1), a geomagnetic sensor 240, and a posture sensor 250. The components included in FIG. 2 are some of the components included in the electronic device 200, and the electronic device 200 may include various other components, as illustrated in FIG. 1.

According to various embodiments, the geomagnetic sensor 240 may include a sensor for measuring a magnetic force (geomagnetism) of the earth, and may include a three-axis geomagnetic sensor capable of measuring the geomagnetism of each of the x-axis, y-axis, and z-axis. According to an embodiment, the geomagnetic sensor 240 may include various types of sensors such as a hall sensor, a magneto resistance (MR) sensor, and a magneto impedance (MI) sensor.

According to various embodiments, the posture sensor 250 may measure a posture of the electronic device 200. According to an embodiment, the posture sensor 250 may measure the degree of inclination (rotation angles of roll, pitch, and yaw axes around a reference axis) of the electronic device 200. For example, the posture sensor 250 may include a gravity sensor, an acceleration sensor, and/or a gyro sensor.

Figure 3:
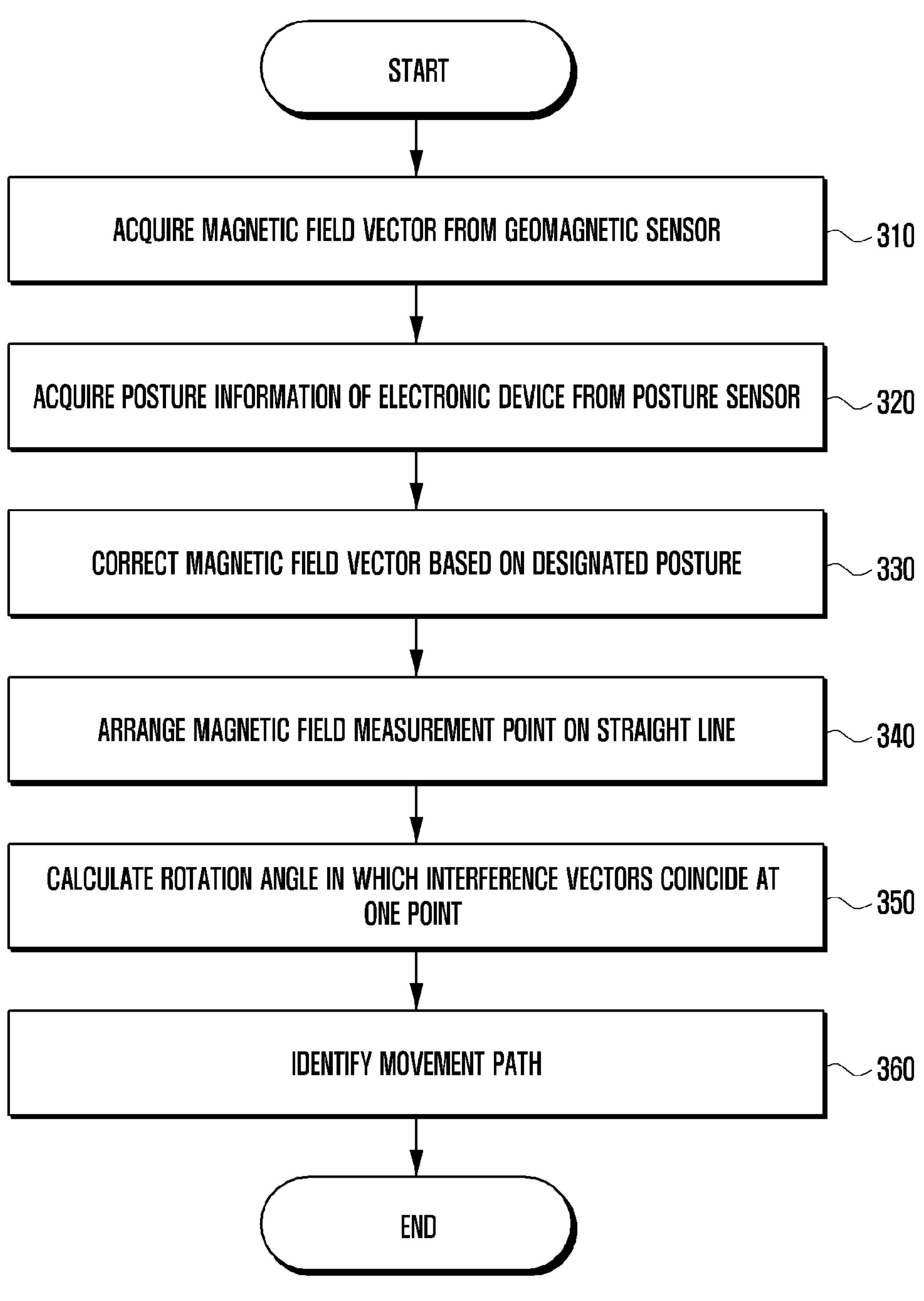
FIG. 3 is a flowchart illustrating an example method for a processor to identify a movement path of an electronic device using a magnetic field vector according to various embodiments.

FIG. 3 is a flowchart illustrating an example method for the processor (e.g., the processor 220 of FIG. 2) to identify a movement path of the electronic device (e.g., the electronic device 200 of FIG. 2) using a magnetic field vector according to various embodiments.

According to various embodiments, in operation 310, the processor 220 may acquire a magnetic field vector from a geomagnetic sensor (e.g., the geomagnetic sensor 240 of FIG. 2).

According to an embodiment, the geomagnetic sensor 240 may include a sensor for measuring a magnetic force (geomagnetism) of the earth, and may include a three-axis geomagnetic sensor capable of measuring the geomagnetism $M_x$, $M_y$, $M_z$ of each of the x-axis, y-axis, and z-axis. According to an embodiment, the geomagnetic sensor 240 may include various types of sensors such as a hall sensor, a magneto resistance (MR) sensor, and a magneto impedance (MI) sensor.

According to an embodiment, the processor 220 may acquire a magnetic field vector (M: $M_x$, $M_y$, $M_z$) measured in at least three points by the geomagnetic sensor 240. For example, the plurality of magnetic field vectors M may be values measured at different points while the electronic device 200 is moving.

According to various embodiments, in operation 320, the processor 220 may acquire posture information of the electronic device 200 from a posturesensor (e.g., the posture sensor 250 of FIG. 2).

According to various embodiments, the posture sensor 250 may measure a posture of the electronic device 200. According to an embodiment, the posture sensor 250 may measure the degree of inclination (rotation angles of roll, pitch, and yaw axes around a reference axis) of the electronic device 200. For example, the posture sensor 250 may include a gravity sensor, an acceleration sensor, and/or a gyro sensor.

According to an embodiment, the processor 220 may acquire posture information (e.g., rotation angles of roll, pitch, and yaw axes) of the electronic device 200 from the posture sensor 250.

According to various embodiments, in operation 330, the processor 220 may correct the magnetic field vector based on the designated posture of the electronic device 200.

According to an embodiment, the designated posture may refer, for example, to a posture of the electronic device 200 that enables the X-axis (side direction of the electronic device), the Y-axis (upper surface direction of the electronic device), and the Z-axis (front direction of the electronic device) of the electronic device 200 to indicate designated directions.

According to an embodiment, the processor 220 may determine a correction equation of enabling the posture of the electronic device 200 to be a designated posture, and correct the magnetic field vector to a vector on a coordinate system of the designated posture based on the correction equation. For example, the processor 220 may determine a correction equation (e.g., $X=X'-a$, $Y=Y'-b$, $Z=Z'-c$) that enables three axes (X', Y', and Z' axes) on a coordinate system of a current posture of the electronic device 200 to be three axes (X, Y, and Z axes), respectively on a coordinate system of a reference posture, and correct the magnetic field vector on the coordinate system of the current posture to the magnetic field vector on the reference posture coordinate system.

According to various embodiments, in operation 340, the processor 220 may arrange points at which the geomagnetic sensor 240 measures the magnetic field on a straight line.

According to an embodiment, in order to obtain a movement path of the electronic device 200, the processor 220 may arrange at least three points at which the geomagnetic sensor 240 measures the magnetic field on a straight line in a virtual space. Points arranged on a straight line may be a movement path of the electronic device 200. In general, because an interval at which the geomagnetic sensor 240 measures the magnetic field is as small as 10 ms to 20 ms, each measurement point may be regarded as being on one straight line.

According to various embodiments, in operation 350, the processor 220 may identify (e.g., calculate) a rotation angle of a straight line connecting a plurality of magnetic field measurement points at which lines extending a plurality of interference vectors converge at one point.

According to an embodiment, the processor 220 may identify an interference vector based on the magnetic field vector and the magnetic north vector. According to an embodiment, the interference vector may be a magnetic field vector generated by an external material (interference) having a magnetic field in a space in which the electronic device 200 is located. The interference vector may refer, for example, to a difference between a magnetic field measured by the electronic device 200 due to characteristics of a space in which the electronic device 200 is located and an actual magnetic field in a region in which the electronic device 200 is located. In general, a direction of the magnetic field vector measured outdoors may be toward magnetic north (E), and a magnitude of the magnetic field vector may be measured differently according to a region. For example, the strength of the earth's magnetic field measured in Korea may be measured as about 50 μT (micro Tesla). However, a magnetic field vector measured indoors is distorted by interference according to peripheral structures and geomagnetic distribution conditions to represent a direction and magnitude thereof different from a magnetic field vector measured outdoors. According to an embodiment, the processor 220 may determine a difference between the magnetic field vector and the magnetic north vector as an interference vector.

According to an embodiment, the processor 220 may rotate a straight line connecting a plurality of magnetic field measurement points from a first direction to a second direction, and identify whether lines extending in directions indicated by interference vectors at each position meet at one point.

According to an embodiment, in the case that there is no magnetic north vector information, the processor 220 may rotate the magnetic north vector in a first direction of a straight line connecting a plurality of magnetic field measurement points to identify whether lines extending in directions indicated by the interference vectors meet at one point. For example, the processor 220 may perform the same operation in the second direction corresponding to the case that lines extending in directions indicated by the vectors do not meet at one point as a result of rotating the magnetic north vector at all angles in the first direction. That is, the processor 220 may rotate the magnetic north vector in the second direction to identify whether lines extending in directions indicated by the interference vectors meet at one point.

According to an embodiment, the processor 220 may rotate a coordinate system of each electronic device 200 at the magnetic field measurement point by an angle that rotates the straight line connecting the magnetic field measurement points, thereby acquiring the same result as rotating the straight line connecting the magnetic field measurement points. That is, the processor 220 may rotate each magnetic field vector at the magnetic field measurement points in the opposite direction by an angle that rotates the straight line connecting the magnetic field measurement points, thereby acquiring the same result as rotating the straight line connecting the magnetic field measurement points. For example, because rotating a straight line connecting the magnetic field measurement points by θ is the same as or similar to rotating the magnetic field vector by −θ, the processor 220 may rotate an interference vector, which is a difference between the magnetic field vector and the magnetic north vector by −θ and obtain a rotation angle at which lines extending the vectors converge at one point.

According to an embodiment, the processor 220 may identify a rotation angle at which lines extending a plurality of interference vectors converge at one point based on slopes of the plurality of interference vectors and distances between the plurality of interference vectors. For example, the processor 220 may generate an equation for determining slopes of a plurality of interference vectors using an intersection point at which lines extending a plurality of interference vectors meet at one point, and determine a rotation angle obtained by substituting the plurality of interference vectors into the equation as a rotation angle at which lines extending a plurality of interference vectors converge at one point.

According to an embodiment, the processor 220 may determine a rotation angle at which lines extending a plurality of interference vectors converge at one point using an average distance of a plurality of intersection points at which lines extending a plurality of interference vectors, respectively meet. For example, the processor 220 may identify a plurality of intersection points at which lines extending a plurality of interference vectors, respectively meet, and obtain an average and/or sum of distances between the intersection points. According to an embodiment, the processor 220 may compare the average and/or sum of distances between intersection points with a designated value, and in the case that the average and/or sum is less than or equal to the designated value, the processor 220 may regard that straight lines extending the interference vectors converge at one point, and determine the rotation angle.

According to various embodiments, in operation 360, the processor 220 may identify a movement path of the electronic device 200.

According to an embodiment, the processor 220 may identify a movement path of the electronic device 200 based on a rotation angle at which lines extending a plurality of interference vectors converge at one point. For example, the processor 220 may determine that a direction indicated by a rotation angle of a straight line connecting magnetic field measurement points is a moving direction of the electronic device 200.

According to an embodiment, the processor 220 may determine a moving direction of the electronic device 200 based on acceleration information of the electronic device 200 acquired from an acceleration sensor. For example, the processor 220 may determine a direction in which the acceleration information becomes a positive value (+) to a moving direction of the electronic device 200 based on acceleration information of the electronic device 200 acquired at a plurality of magnetic field measurement points.

The magnetic north vector M according to various embodiments has a 3-dimensional value $$M_x, M_y, M_z,$$

but in FIGS. 4 to 7, only a 2-dimensional value $$M_x, M_y,$$

is described for a simple and clear description. A person skilled in the art will be able to achieve the object of the disclosure even in a three-dimensional environment using the methods described in greater detail below with reference to FIGS. 4 to 7C.

Figure 4:
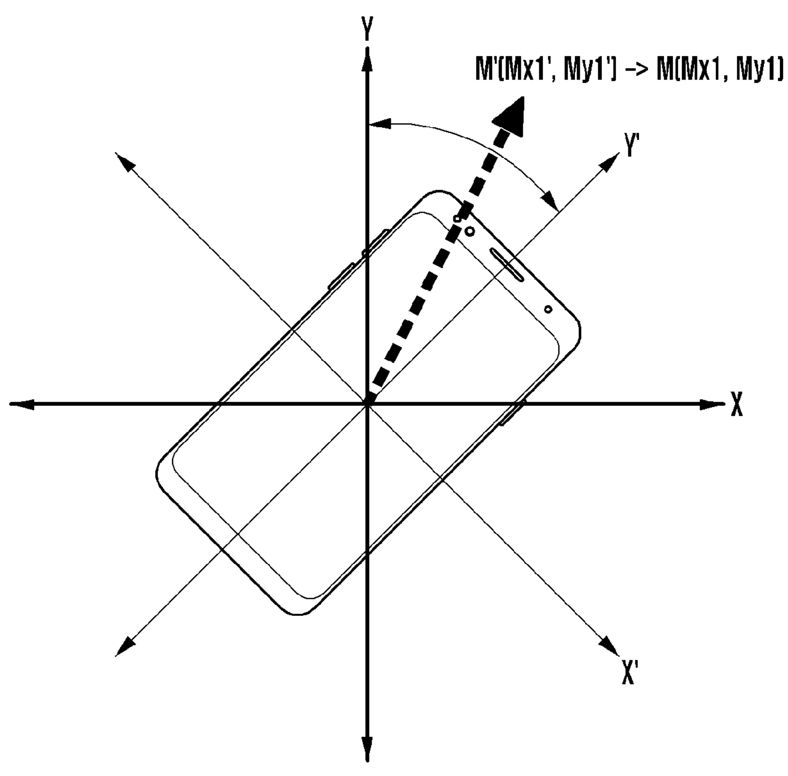
FIG. 4 is a diagram illustrating an example in which a processor corrects a magnetic field vector in a manner of enabling a posture of an electronic device to be a designated posture according to various embodiments.

FIG. 4 is a diagram illustrating an example in which the processor (e.g., the processor 220 of FIG. 2) corrects a magnetic field vector in a manner of enabling a posture of the electronic device (e.g., the electronic device 200 of FIG. 2) to be a designated posture according to various embodiments.

According to an embodiment, the designated posture may refer, for example, to a posture of the electronic device 200 that enables the X axis (side direction of the electronic device) and the Y axis (upper surface direction of the electronic device) of the electronic device 200 to indicate designated directions.

According to an embodiment, the processor 220 may determine a correction equation for enabling the posture of the electronic device 200 to be a designated posture, and correct a magnetic field vector to a vector on a coordinate system of a designated posture based on the correction equation. For example, the processor 220 may determine a correction formula (e.g., X=X'−a, Y=Y'−b) that enables the X' and Y' axes on a coordinate system of a current posture of the electronic device 200 to be the X and Y axes on a coordinate system of the designated posture, and correct a magnetic field vector $$M'(M_x1', M_y1')$$

on the coordinate system of the current posture to a vector $$M(M_x1, M_y1)$$

on a designated posture coordinate system.

Figure 5A:
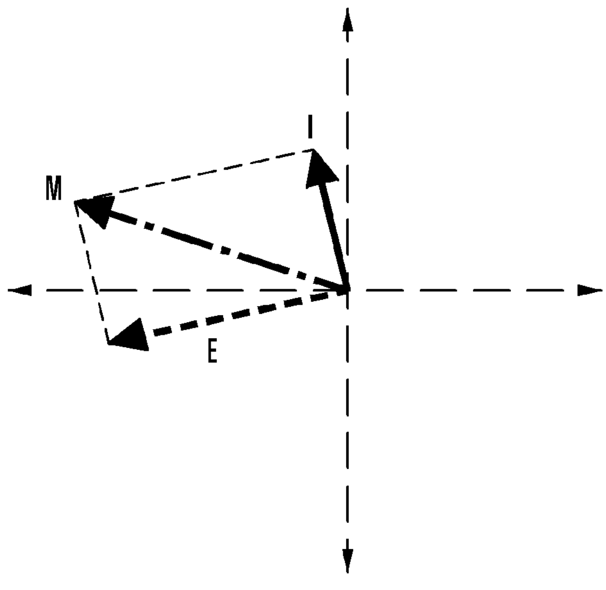
FIGS. 5A and 5B are diagrams illustrating example operations in which a processor identifies an interference vector and arranges points at which a geomagnetic sensor measures a plurality of magnetic fields on a straight line according to various embodiments.
Figure 5B:
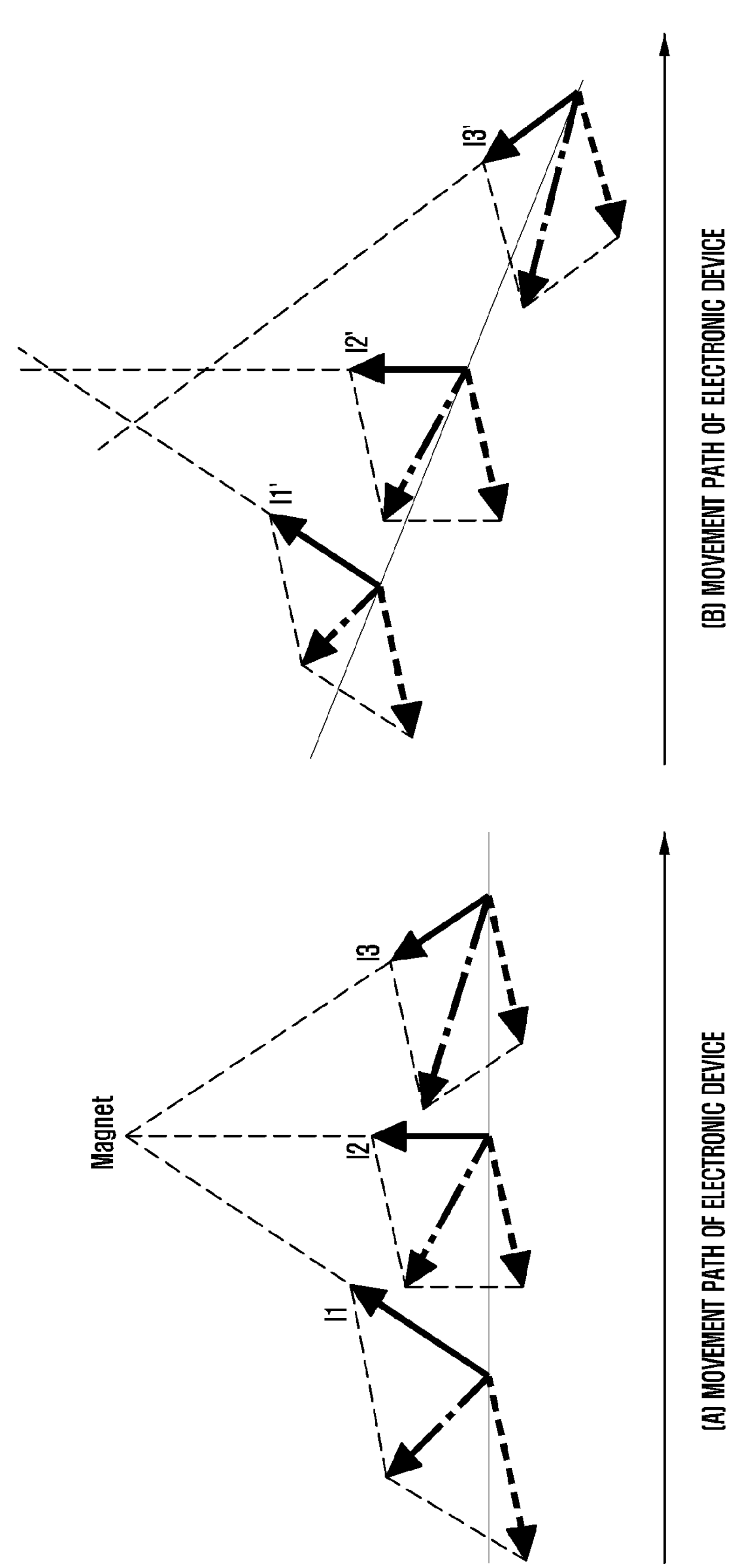

FIGS. 5A and 5B are diagrams illustrating example operations in which the processor (e.g., the processor 220 of FIG. 2) identifies an interference vector and to arrange points at which the geomagnetic sensor 240 measures a plurality of magnetic fields on a straight line according to various embodiments.

FIG. 5A is a diagram illustrating an example method for the processor 220 to identify an interference vector I based on a magnetic field vector M and a magnetic north vector E according to various embodiments.

According to an embodiment, the interference vector I may be a magnetic field vector generated by an external material (interference) having a magnetic field in a space in which the electronic device 200 is located. The interference vector I may refer, for example, to a difference between a magnetic field measured by the electronic device 200 due to characteristics of a space in which the electronic device 200 is located and an actual magnetic field in a region in which the electronic device 200 is located.

According to an embodiment, a magnetic field vector M acquired by the electronic device 200 from the magnetic field sensor 240 may represent a direction and magnitude of a magnetic field formed around the electronic device 200. In general, a direction of the magnetic field vector outdoors may be toward magnetic north (E), and a magnitude of the magnetic field vector may be measured differently according to a region. For example, the strength of the earth's magnetic field measured in Korea may be measured as about 50 μT (micro Tesla). However, a magnetic field vector measured indoors is distorted according to peripheral structures and geomagnetic distribution conditions to represent a direction and magnitude thereof different from a magnetic field vector measured outdoors. Accordingly, in the case that the magnetic field is distorted by the peripheral structure, the processor 220 may determine a difference between the magnetic field vector $$M(M_x, M_y)$$

and the magnetic north vector $$E(E_x, E_y)$$

measured by the magnetic field sensor 240 as in Equation 1 as an interference vector $$I(I_x, I_y)$$

by the peripheral structure.

$$I_x = M_x - E_x \quad \text{[Equation 1]}$$
$$I_y = M_y - E_y$$

FIG. 5B is a diagram illustrating an example method for the processor 220 to identify interference by arranging a plurality of points at which the geomagnetic sensor 240 measures a magnetic field in a straight line according to various embodiments.

According to an embodiment, in order to obtain a movement path of the electronic device 200, the processor 220 may arrange at least three points at which the geomagnetic sensor 240 measures a magnetic field on a straight line in a virtual space. In other words, points arranged on a straight line may be a movement path of the electronic device 200. In general, because an interval at which the geomagnetic sensor 240 measures the magnetic field is as small as 10 ms to 20 ms, each measurement point may be regarded as being on one straight line.

For example, as illustrated in FIG. 5B(A), in the case that a straight line connecting a plurality of magnetic field measurement points by the processor 220 match a movement path of the electronic device 200, lines extending interference vectors I1, I2, and I3 at each measurement point may meet at one point, and one point may refer, for example, to interference and/or magnet.

However, as illustrated in FIG. 5B(B), in the case that a straight line connecting the plurality of magnetic field measurement points by the processor 220 does not coincide a movement path of the electronic device 200, lines extending directions indicated by the interference vectors I1', I2', and I3' do not meet at one point.

Therefore, the processor 220 may rotate a straight line connecting the plurality of magnetic field measurement points at different angles, and find a rotation angle of a straight line in which lines extending directions indicated by the respective interference vectors meet at one point at each rotated angle to determine a movement path of the device 200.

Figure 6A:
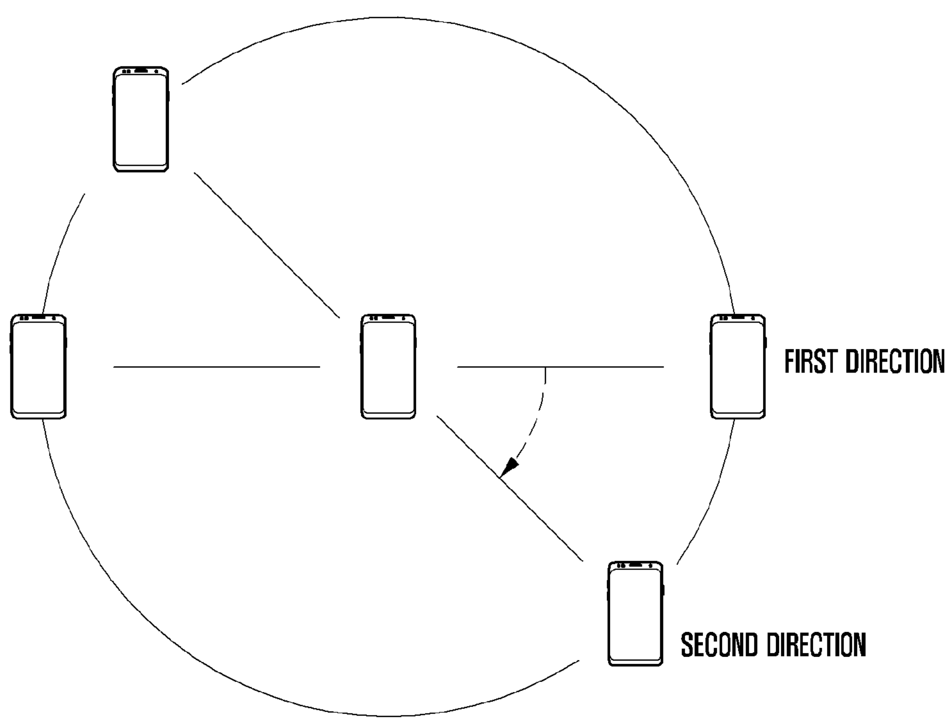
FIGS. 6A, 6B, and 6C are diagrams illustrating example operations in which a processor rotates a straight line in order to find a straight line connecting a plurality of magnetic field measurement points that coincide with a movement path of an electronic device according to various embodiments.
Figure 6B:
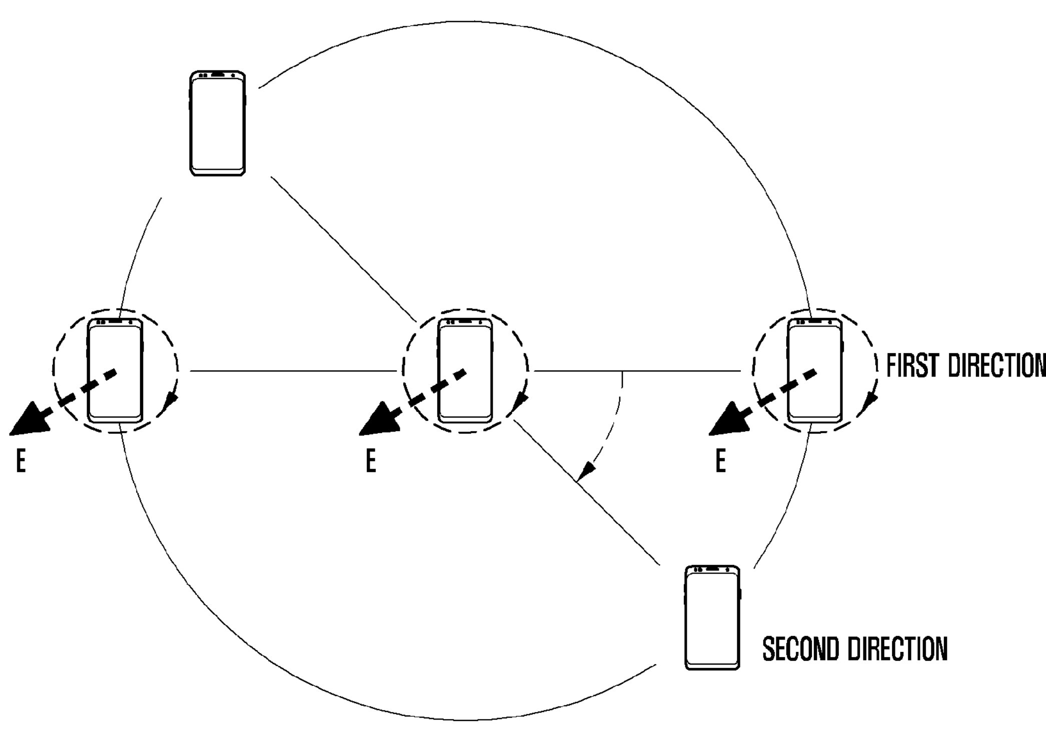
Figure 6C:
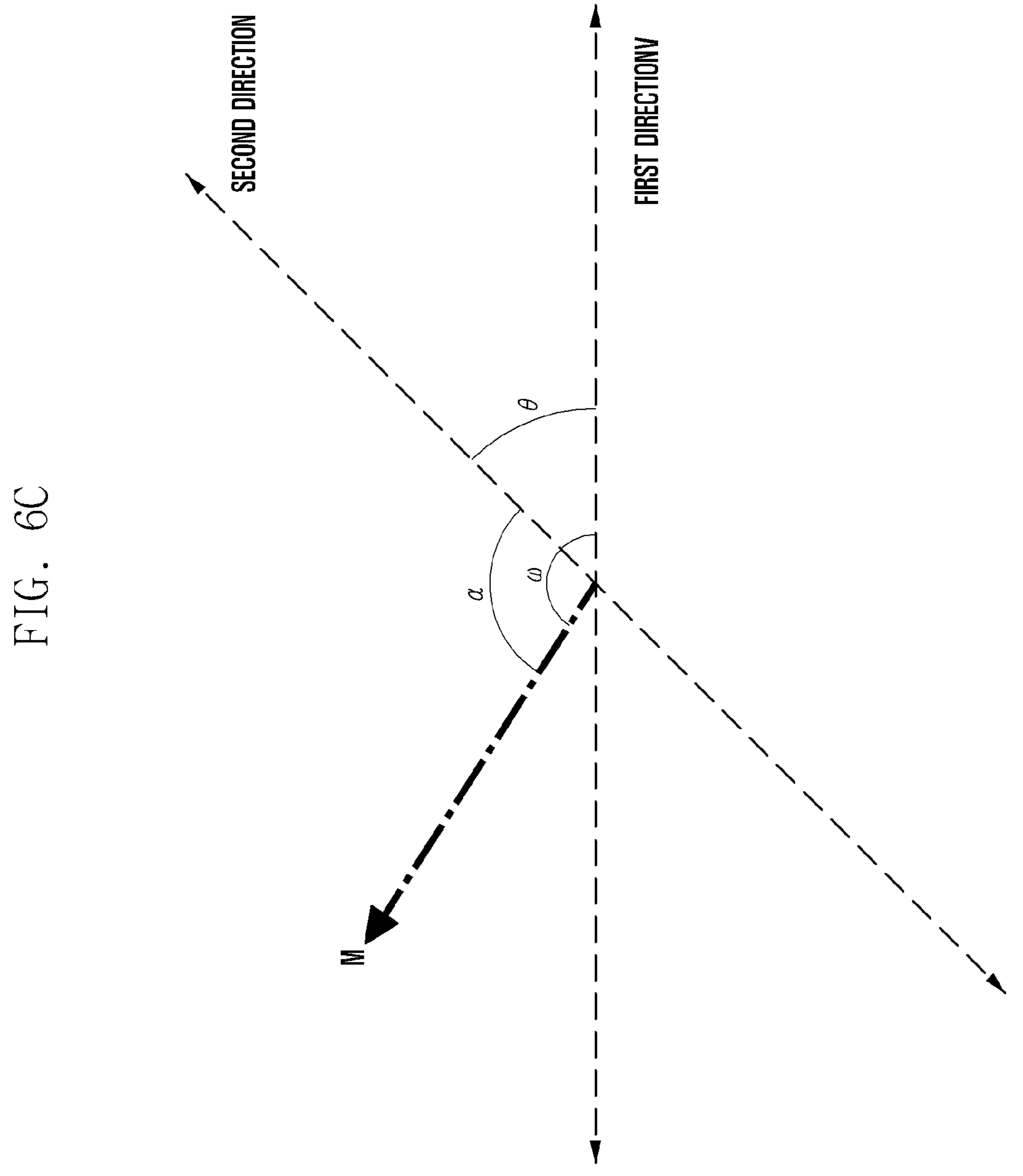

FIGS. 6A, 6B, and 6C are diagrams illustrating example operations in which the processor (e.g., the processor 220 of FIG. 2) rotates a straight line in order to find a straight line connecting a plurality of magnetic field measurement points that coincide with a movement path of the electronic device 200 according to various embodiments.

FIG. 6A is a diagram illustrating a method for the processor 220 to identify a rotation angle of a straight line that coincides with a movement path of the electronic device 200 by rotating a straight line connecting a plurality of magnetic field measurement points.

According to an embodiment, the processor 220 may rotate a straight line connecting a plurality of magnetic field measurement points from a first direction to a second direction, and identify whether lines extending in directions indicated by interference vectors at each position meet at one point.

FIG. 6B is a diagram illustrating an example method for the processor 220 to identify a rotation angle of a straight line coinciding with a movement path of the electronic device 200 corresponding to absence of information on the magnetic north vector E.

According to an embodiment, the processor 220 may identify whether lines extending the interference vectors meet at one point by rotating the magnetic north vector E in a first direction of a straight line connecting a plurality of magnetic field measurement points corresponding to absence of information on the magnetic north vector E.

According to an embodiment, the processor 220 may perform the same operation in a second direction corresponding to the case that there is no point at which lines extending in directions indicated by vectors meet at one point as a result of rotating the magnetic north vector E in a first direction at all angles. That is, the processor 220 may rotate the magnetic north vector E in the second direction to identify whether lines extending in directions indicated by the interference vectors meet at one point.

FIG. 6C is a diagram illustrating an example method for the processor 220 to identify an angle at which an interference vector indicates one point by rotating a straight line connecting a plurality of magnetic field measurement points.

According to an embodiment, the processor 220 may rotate a coordinate system of each electronic device 200 at the magnetic field measurement point by an angle that rotates a straight line connecting the magnetic field measurement points, thereby acquiring the same result as rotating the straight line connecting the magnetic field measurement points. That is, the processor 220 may rotate each magnetic field vector M at the magnetic field measurement point in an opposite direction by an angle that rotates the straight line connecting the magnetic field measurement points, thereby acquiring the same result as rotating the straight line connecting the magnetic field measurement points. For example, in order to find a movement path of the electronic device 200 in which interference vectors meet at one point, the processor 220 may rotate a straight line connecting magnetic field measurement points by a rotation angle θ from a first direction to a second direction. In this case, a difference between an angle ω of a magnetic field vector M measured in the first direction and an angle α of a magnetic field vector M measured in a second direction becomes the same as or similar to the rotation angle θ. Accordingly, in order to obtain the same result as that obtained by rotating the straight line connecting the magnetic field measurement points from the first direction to the second direction by a rotation angle θ, the processor 220 may rotate the magnetic field vector M by −θ.

According to an embodiment, the processor 220 may identify a difference between the magnetic field vector M and the magnetic north vector E as an interference vector I, as in Equation 1.

Because rotating the straight line connecting the magnetic field measurement points by θ is the same as or similar to rotating the magnetic field vector M by −θ, the processor 220 may rotate an interference vector I, which is a difference between the magnetic field vector M and the magnetic north vector E by −θ, and identify an rotation angle at which lines extending the interference vector I converge at one point.

For example, in FIG. 5B, when a straight line connecting the magnetic field measurement points in FIG. 5B(B) is rotated by θ from the straight line connecting the magnetic field measurement points in FIG. 5B(A), interference vectors I1', I2', and I3' of FIG. 5B(B) is the same as or similar to a value obtained by rotating the interference vectors I1, I2, and I3 in FIG. 5B(A) by −θ. Accordingly, x and y coordinates of the interference vectors I1', I2', and I3' may be expressed as in Equation 2. However, in the embodiment, identifying while rotating −θ and identifying while rotating by θ, which is the opposite direction derive the same result; thus, the equation expresses the case of rotating by θ.

$$I1'_x = I1_x\cos\theta - I1_y\sin\theta \quad \text{[Equation 2]}$$

$$I1'_y = I1_x\sin\theta + I1_y\cos\theta$$

$$I2'_x = I2_x\cos\theta - I2_y\sin\theta$$

$$I2'_y = I2_x\sin\theta + I2_y\cos\theta$$

$$I3'_x = I3_x\cos\theta - I3_y\sin\theta$$

$$I3'_y = I3_x\sin\theta + I3_y\cos\theta$$

According to an embodiment, in the case that the processor 220 does not have information related to the magnetic north vector, the processor 220 may rotate a magnetic north by θe in the same manner as in Equation 2 with respect to a magnetic north vector E to obtain a magnetic north E' as in Equation 3.

$$E'_x = E_x\cos\theta_e - E_y\sin\theta_e \quad \text{[Equation 3]}$$

$$E'_x = E_x\sin\theta_e + E_y\cos\theta_e$$

According to an embodiment, in the case that the processor 220 does not have information related to the magnetic north vector, the processor 220 may identify an interference vector according to Equation 1 with respect to the magnetic north vector E' obtained according to Equation 3 and then rotate the interference vector θ according to Equation 2 to identify a rotation angle at which the interference vectors converge at one point.

Figure 7A:
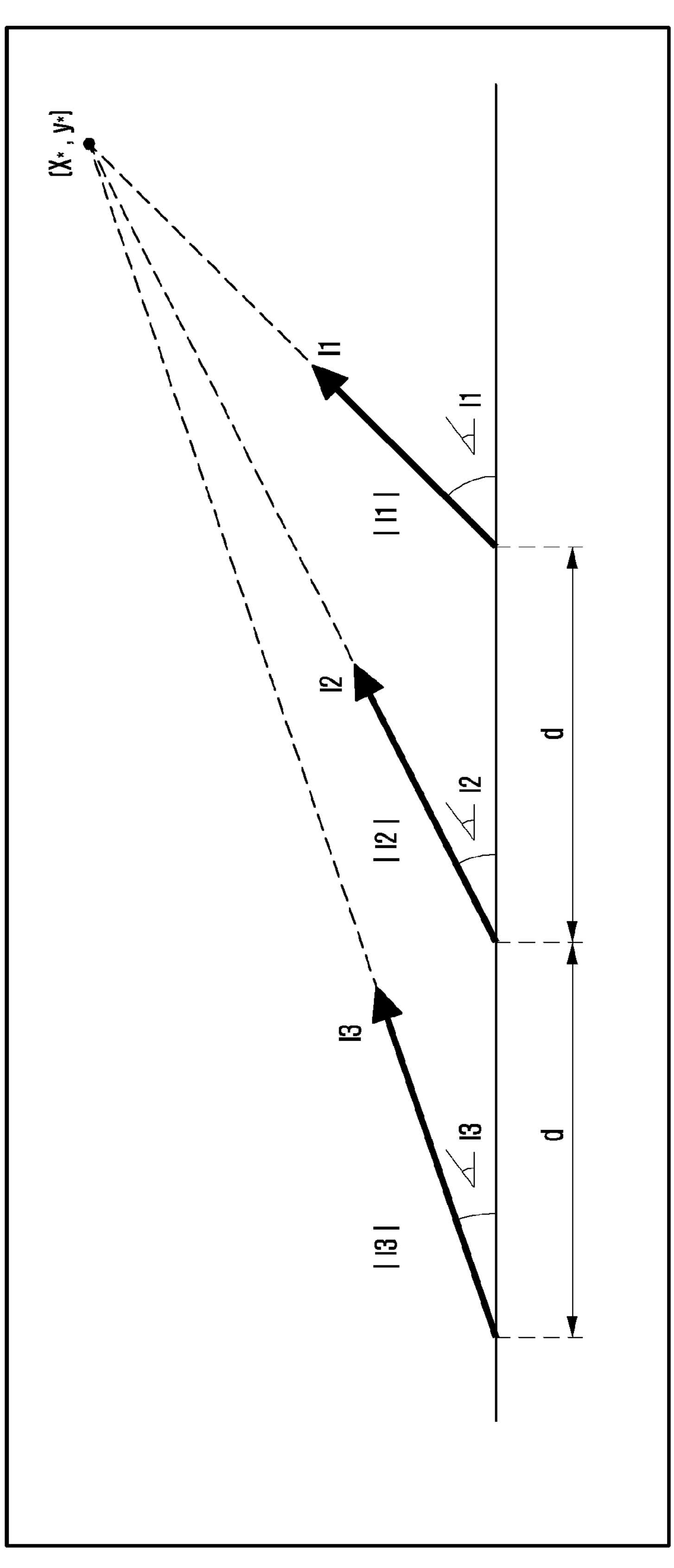
FIGS. 7A, 7B, and 7C include diagrams and a flowchart illustrating example operations in which a processor identifies a rotation angle at which lines extending a plurality of interference vectors converge at one point according to various embodiments.
Figure 7B:
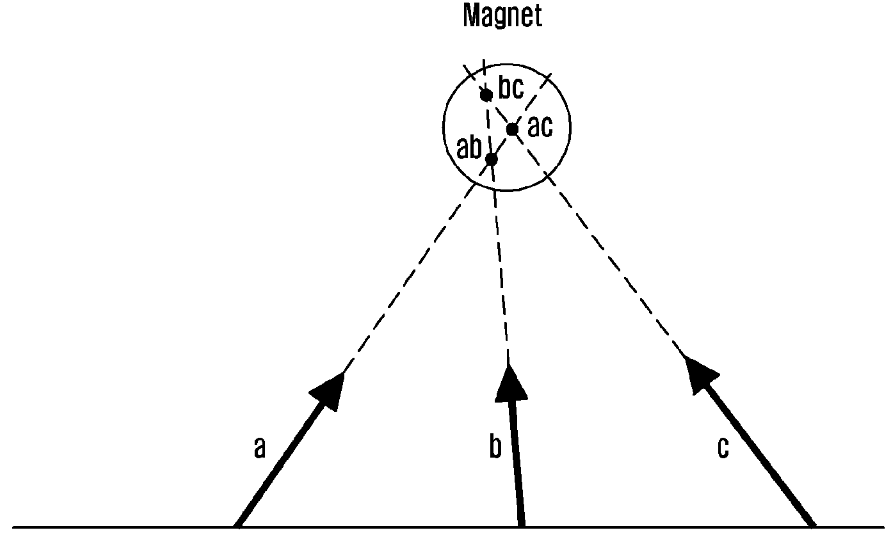
Figure 7C:
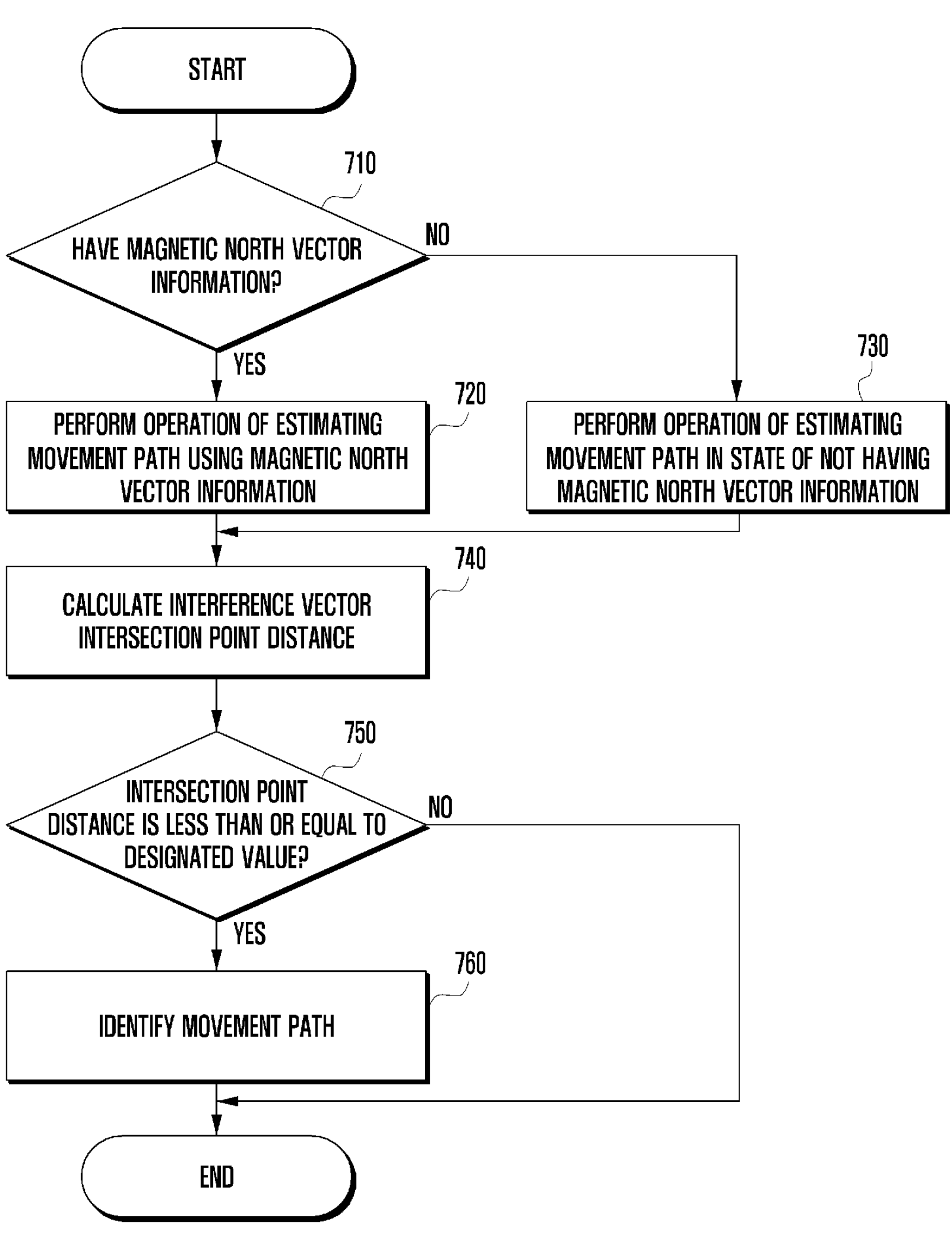

FIGS. 7A, 7B, and 7C includes diagrams and a flowchart illustrating example operations in which the processor (e.g., the processor 220 of FIG. 2) identifies a rotation angle at which lines extending a plurality of interference vectors I1, I2, and I3 meet at one point according to various embodiments.

FIG. 7A is a diagram illustrating an example method for the processor 220 to identify a point at which lines extending a plurality of interference vectors I1, I2, and I3 meet at one point according to various embodiments.

According to an embodiment, the processor 220 may identify slopes of the plurality of interference vectors I1, I2, and I3 as in Equation 4 using an intersection point (x*, y*) in which lines extending the plurality of interference vectors I1, I2, and I3 meet at one point.

$$\text{Slope of } I1 = \frac{y^*}{x^* - d} = \frac{I1^*_y}{I1^*_x} \quad \text{[Equation 4]}$$

$$\text{Slope of } I2 = \frac{y^*}{x^*} = \frac{I2^*_y}{I2^*_x}$$

$$\text{Slope of } I3 = \frac{y^*}{x^* + d} = \frac{I3^*_y}{I3^*_x}$$

Summarizing Equation 4, Equation 5 that establishes in the case that the interference vectors I1, I2, and I3 meet at one point may be derived.

$$Ii^* = \frac{Ii^*_y}{Ii^*_x} \quad \text{[Equation 5]}$$

$$\frac{1}{I1^*} + \frac{1}{I3^*} = \frac{2}{I2^*}$$

According to an embodiment, the processor 220 may identify whether the interference vectors I1, I2, and I3 satisfy Equation 5, and identify whether extension lines of the plurality of interference vectors I1, I2, and I3 meet at one point based on the identification result.

According to an embodiment, in the case that there are a plurality of points at which extension lines of a plurality of interference vectors meet at one point, the processor 220 may compare four or more magnetic field measurement points to remove false positive points.

FIG. 7B is a diagram illustrating an example method for the processor 220 to determine interference in the case that lines extending a plurality of interference vectors do not meet at one point according to various embodiments.

Theoretically, in a straight line connecting magnetic field measurement points that coincide with a movement path, straight lines extending a plurality of interference vectors should converge at one point, but straight lines extending a plurality of interference vectors may not converge at one point due to noise of a magnetic field measurement value and/or an error in a magnetic north vector. Further, even if it is not a problem of noise, in the case that a straight line connecting magnetic field measurement points may not be continuously rotated, a point at which lines extending a plurality of interference vectors converge at one point may not be identified.

According to an embodiment, the processor 220 may identify a point at which lines extending interference vectors a, b, and c, respectively meet, that is, a point ab at which an extension line of an interference vector a and an extension line of an interference vector b meet, a point be at which an extension line of an interference vector b and an extension line of an interference vector c meet, and a point ac at which an extension line of an interference vector a and an extension line of an interference vector c meet. The processor 220 may obtain respective distances between the intersection points ab, bc, and ac to obtain an average and/or a sum of distances. For example, the processor 220 may identify a distance dist(ab,bc) between the intersection point ab and the intersection point bc, a distance dist(bc,ac) between the intersection point be and the intersection point ac, and a distance dist(ab, ac) between the intersection points ab and ac, and an average and/or sum of dist(ab,bc), dist(bc, ac), and dist(ab, ac). According to an embodiment, the processor 220 may compare the average and/or sum of distances between intersection points with a designated value, and in the case that the average and/or sum of distances between intersection points is less than or equal to a designated value, the processor 220 may regard that straight lines extending the interference vectors converge at one point, and determine a rotation angle.

FIG. 7C is a flowchart illustrating an example method in the case that the processor 220 performs an operation in the manner of FIG. 7B but does not derive a result according to various embodiments.

According to an embodiment, in operation 710, the processor 220 may identify whether the processor 220 has magnetic north vector information.

According to an embodiment, in operation 720, the processor 220 may perform operation of estimating a movement path with the magnetic north vector information corresponding to having the magnetic north vector information (e.g., operation 710—yes). For example, the processor 220 may perform some of operations of identifying a movement path of the electronic device 200 in the method described in operations 320 to 350 of FIG. 3.

According to an embodiment, in operation 730, in the case that there is no magnetic north vector information corresponding to not having magnetic north vector information (e.g., operation 710—No), the processor 220 may perform operation of estimating a movement path. For example, the processor 220 may perform some of operations of identifying a movement path of the electronic device 200 by the method described in operations 320 to 350 of FIG. 3 and the method described in relation to FIG. 6B.

According to an embodiment, in operation 740, the processor 220 may identify (e.g., calculate) a distance between intersection points in the method described in relation to FIG. 7B.

According to an embodiment, in operation 750, the processor 220 may determine whether an average and/or sum of distances between intersection points is less than or equal to a designated value.

According to an embodiment, in operation 760, the processor 220 may detect (e.g., identify) a movement path of the electronic device 200 corresponding to the average and/or sum of distances between intersection points being less than or equal to a designated value (e.g., operation 750—yes). For example, the processor 220 may identify a movement path of the electronic device 200 in the method described in operation 360 of FIG. 3.

According to an embodiment, the processor 220 may end the operation corresponding to the average and/or sum of distances between intersection points exceeding a designated value (e.g., operation 750—No). For example, the processor 220 may perform again the operation from operation 310 of FIG. 3.

An electronic device according to various example embodiments of the disclosure may include: a geomagnetic sensor; a posture sensor configured to measure a posture of the electronic device; and a processor operably connected with the geomagnetic sensor and the posture sensor, wherein the processor may be configured to: acquire a plurality of magnetic field vectors from the geomagnetic sensor, acquire posture information of the electronic device from the posture sensor, correct the plurality of magnetic field vectors to enable a posture of the electronic device to be a designated posture based on posture information of the electronic device, identify a plurality of interference vectors based on the plurality of corrected magnetic field vectors and a magnetic north vector, identify a rotation angle at which lines extending the plurality of interference vectors converge at one point by rotating a straight line connecting a plurality of magnetic field measurement points measured by the geomagnetic sensor, and identify a moving direction of the electronic device based on the identified rotation angle.

In the electronic device according to various example embodiments of the disclosure, the processor may be configured to identify the plurality of interference vectors based on a difference between the plurality of corrected magnetic field vectors and the magnetic north vector.

In the electronic device according to various example embodiments of the disclosure, the processor may be configured to rotate a straight line connecting the plurality of magnetic field measurement points by a specified angle (e.g., θ) by rotating the plurality of interference vectors by a negative of the specified angle (e.g., −θ).

In the electronic device according to various example embodiments of the disclosure, the processor may be configured to determine the magnetic north vector based on a rotation angle of the magnetic north vector in which lines extending the plurality of interference vectors coincide at one point by rotating a magnetic north vector in a first direction of a straight line connecting the plurality of magnetic field measurement points corresponding to absence of information of the magnetic north vector.

In the electronic device according to various example embodiments of the disclosure, the processor may be configured to identify the rotation angle at which lines extending the plurality of interference vectors meet at one point based on a slope of the plurality of interference vectors and a distance between the plurality of interference vectors.

In the electronic device according to various example embodiments of the disclosure, the processor may be configured to identify a plurality of intersection points at which lines extending the plurality of interference vectors, respectively meet, to identify an average of distances between the plurality of intersection points, and to identify the rotation angle based on lines extending the plurality of interference vectors meet at one point corresponding to the average being less than or equal to a designated value.

In the electronic device according to various example embodiments of the disclosure, the processor may be configured to determine the magnetic north vector by identifying a rotation angle of the magnetic north vector in which lines extending the plurality of interference vectors meet at one point by rotating the magnetic north vector in a first direction of a straight line connecting the plurality of magnetic field measurement points corresponding to the average being not equal to or less than a designated value.

The electronic device according to various example embodiments of the disclosure may further include an acceleration sensor, wherein the processor may be configured to identify a moving direction of the electronic device based on acceleration information of the electronic device acquired from the acceleration sensor.

In the electronic device according to various example embodiments of the disclosure, the processor may be configured to determine a value in which acceleration information of the electronic device is positive as the moving direction of the electronic device.

A method of operating an electronic device according to various example embodiments of the disclosure may include: acquiring a plurality of magnetic field vectors from a geomagnetic sensor; acquiring posture information of the electronic device from a posture sensor; correcting the plurality of magnetic field vectors by enabling a posture of the electronic device to be a designated posture based on posture information of the electronic device; identifying a plurality of interference vectors based on the plurality of corrected magnetic field vectors and a magnetic north vector; identifying a rotation angle at which lines extending the plurality of interference vectors converge at one point by rotating a straight line connecting a plurality of magnetic field measurement points measured by the geomagnetic sensor; and identifying a moving direction of the electronic device based on the identified rotation angle.

A method of operating an electronic device according to various example embodiments of the disclosure may further include identifying the plurality of interference vectors based on a difference between the plurality of corrected magnetic field vectors and the magnetic north vector.

A method of operating an electronic device according to various example embodiments of the disclosure may include rotating a straight line connecting the plurality of magnetic field measurement points by a specified angle (e.g., $\theta$) by rotating the plurality of interference vectors by a negative of the specified angle (e.g., $-\theta$).

A method of operating an electronic device according to various example embodiments of the disclosure may further include determining a magnetic north vector based on a rotation angle of the magnetic north vector in which lines extending the plurality of interference vectors converge at one point by rotating the magnetic north vector in a first direction of a straight line connecting the plurality of magnetic field measurement points corresponding to absence of information of the magnetic north vector.

A method of operating an electronic device according to various example embodiments of the disclosure may further include identifying the rotation angle at which lines extending the plurality of interference vectors meet at one point based on a slope of the plurality of interference vectors and a distance between the plurality of interference vectors.

A method of operating an electronic device according to various example embodiments of the disclosure may further include identifying a plurality of intersection points at which lines extending the plurality of interference vectors, respectively meet; identifying an average of distances between the plurality of intersection points; and identifying the rotation angle based on lines extending the plurality of interference vectors coincide at one point corresponding to the average being less than or equal to a designated value.

A method of operating an electronic device according to various example embodiments of the disclosure may further include determining the vector based on a rotation angle of the magnetic north vector in which lines extending the plurality of interference vectors coincide at one point by rotating the magnetic north vector in a first direction of a straight line connecting the plurality of magnetic field measurement points corresponding to the average being not less than or equal to a designated value.

A method of operating an electronic device according to various example embodiments of the disclosure may further include identifying a moving direction of the electronic device based on acceleration information of the electronic device acquired from an acceleration sensor.

A method of operating an electronic device according to various example embodiments of the disclosure may further include determining a value in which acceleration information of the electronic device is positive as the moving direction of the electronic device.

It should be appreciated that various embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
- a geomagnetic sensor;
- a posture sensor configured to measure a posture of the electronic device; and
- at least one processor, comprising processing circuitry, in operative connection with the geomagnetic sensor and the posture sensor,
- wherein the at least one processor, individually and/or collectively, is configured to:
- acquire a plurality of magnetic field vectors from the geomagnetic sensor,
- acquire posture information of the electronic device from the posture sensor,
- correct the plurality of magnetic field vectors based on the posture information,
- compare the plurality of corrected magnetic field vectors and a magnetic north vector to determine a plurality of interference vectors,
- determine a rotation angle by rotating a straight line formed by connecting a plurality of magnetic field measurement points corresponding to the plurality of magnetic field vectors until extension lines of the plurality of interference vectors converge at one point using a predefined convergence threshold, identify a moving direction of the electronic device based on the determined rotation angle; and control an operation of the electronic device based on the identified moving direction.

2. The electronic device of claim 1, wherein the at least one processor is configured to identify the plurality of interference vectors based on a difference between the plurality of corrected magnetic field vectors and the magnetic north vector.

3. The electronic device of claim 1, wherein the at least one processor is configured to rotate a straight line connecting the plurality of magnetic field measurement points by θ by rotating the plurality of interference vectors by −θ.

4. The electronic device of claim 1, wherein the at least one processor is configured to determine the magnetic north vector based on a rotation angle of the magnetic north vector in which lines extending the plurality of interference vectors meet at one point by rotating a magnetic north vector in a first direction of a straight line connecting the plurality of magnetic field measurement points corresponding to absence of information of the magnetic north vector.

5. The electronic device of claim 1, wherein the at least one processor is configured to determine the rotation angle at which lines extending the plurality of interference vectors coincide at one point based on a slope of the plurality of interference vectors and a distance between the plurality of interference vectors.

6. The electronic device of claim 1, wherein the at least one processor is configured to:

identify a plurality of intersection points at which lines extending the plurality of interference vectors, respectively meet, identify an average of distances between the plurality of intersection points, and determine the rotation angle by regarding that lines extending the plurality of interference vectors meet at one point, when the average is less than or equal to the predefined convergence threshold.

7. The electronic device of claim 6, wherein the at least one processor is configured to determine the magnetic north vector in a manner of determining a rotation angle of the magnetic north vector in which lines extending the plurality of interference vectors coincide at one point by rotating the magnetic north vector in a first direction of a straight line connecting the plurality of magnetic field measurement points, when the average is greater than a predefined convergence threshold.

8. The electronic device of claim 1, further comprising an acceleration sensor, wherein the at least one processor is configured to identify a moving direction of the electronic device based on acceleration information of the electronic device acquired from the acceleration sensor.

9. The electronic device of claim 8, wherein the at least one processor is configured to determine the moving direction of the electronic device based on a direction in which the acceleration information has a positive value along a measurement axis of the acceleration sensor of the electronic device.

10. The electronic device of claim 1, wherein the at least one processor is configured to:

identify a plurality of intersection points at which lines extending the plurality of interference vectors, respectively meet, identify a sum of distances between the plurality of intersection points, and determine the rotation angle at least by regarding that lines extending the plurality of interference vectors meet at one point, based on the sum of the distances being less than the predefined convergence threshold.

11. The electronic device of claim 1, wherein the at least one processor is configured to:

identify a plurality of intersection points at which lines extending the plurality of interference vectors, respectively meet, calculate a value representing a relationship between the plurality of intersection points, and determine the rotation angle at least by regarding that lines extending the plurality of interference vectors meet at one point, based on a comparison of the value to the predefined convergence threshold.

12. A method of operating an electronic device, the method comprising:

acquiring, by the electronic device, a plurality of magnetic field vectors from a geomagnetic sensor;

acquiring, by the electronic device, posture information of the electronic device from a posture sensor;

correcting, by the electronic device, the plurality of magnetic field vectors based on the posture information;

comparing, by the electronic device, the plurality of corrected magnetic field vectors and a magnetic north vector to determine a plurality of interference vectors;

determining, by the electronic device, a rotation angle at least by rotating a straight line formed by connecting a plurality of magnetic field measurement points corresponding to the plurality of magnetic field vectors until extension lines of the plurality of interference vectors coincide at one point; and identifying, by the electronic device, a moving direction of the electronic device based on the determined rotation angle.

13. The method of claim 12, further comprising identifying, by the electronic device, the plurality of interference vectors based on a difference between the plurality of corrected magnetic field vectors and the magnetic north vector.

14. The method of claim 12, further comprising rotating, by the electronic device, a straight line connecting the plurality of magnetic field measurement points by θ by rotating the plurality of interference vectors by −θ.

15. The method of claim 12, further comprising, by the electronic device, determining the magnetic north vector based on a rotation angle of the magnetic north vector in which lines extending the plurality of interference vectors coincide at one point by rotating the magnetic north vector in a first direction of a straight line connecting the plurality of magnetic field measurement points corresponding to absence of information of the magnetic north vector.

16. The method of claim 12, further comprising determining, by the electronic device, the rotation angle at which lines extending the plurality of interference vectors meet at one point based on a slope of the plurality of interference vectors and a distance between the plurality of interference vectors.

17. The method of claim 12, further comprising:

identifying, by the electronic device, a plurality of intersection points at which lines extending the plurality of interference vectors, respectively meet;

identifying, by the electronic device, an average of distances between the plurality of intersection points; and determining, by the electronic device, the rotation angle by regarding that lines extending the plurality of interference vectors coincide at one point, when the average is less than or equal to a predefined convergence threshold.

18. The method of claim 12, further comprising:

identifying a plurality of intersection points at which lines extending the plurality of interference vectors, respectively meet, calculating a value representing a relationship between the plurality of intersection points, and determining the rotation angle at least by regarding that lines extending the plurality of interference vectors meet at one point, based on a comparison of the value to the predefined convergence threshold.

* * * * *